June 12, 1951  H. L. SIMMONDS  2,556,946
LAWN EDGE TRIMMING ATTACHMENT FOR LAWN MOWERS
Filed Jan. 14, 1949
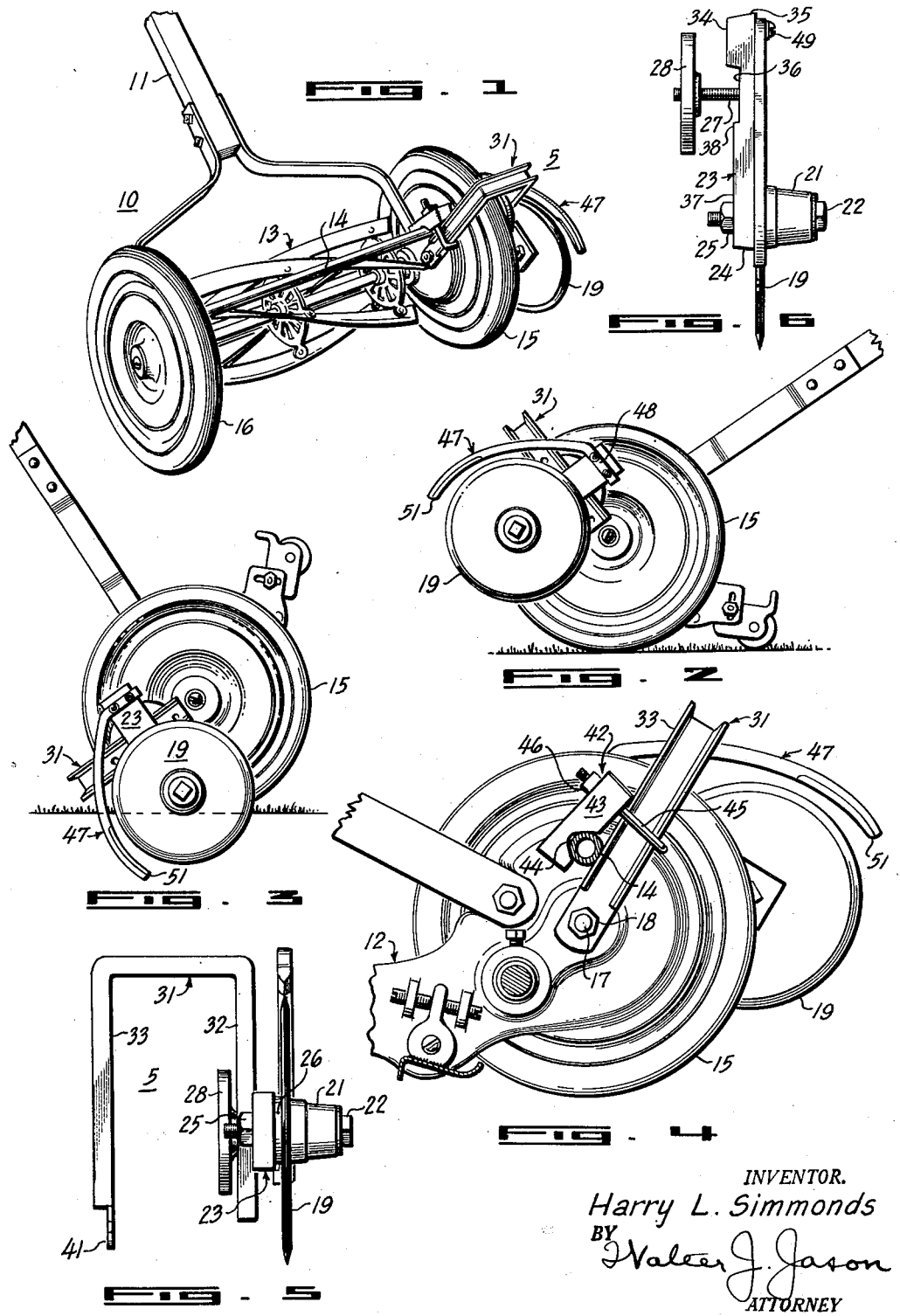
INVENTOR.
Harry L. Simmonds
BY Walter J. Jason
ATTORNEY Patented June 12, 1951

2,556,946

UNITED STATES PATENT OFFICE 2,556,946

LAWN EDGE TRIMMING ATTACHMENT FOR LAWN MOWERS

Harry L. Simmonds, San Diego, Calif.

Application January 14, 1949, Serial No. 70,963

8 Claims. (Cl. 56—251)

This invention relates to lawn mowers and more particularly to an attachment therefor for trimming lawn edges.

An object of the present invention is to provide an improved construction for a lawn edge trimming attachment which permits its ready mounting to and dismounting from a lawn mower, and which construction particularly adapts the attachment for working along the edges of walks, around flower beds, tree wells, and the like.

Another object of the invention is the provision of a lawn edge trimming attachment of this character embodying an improved mounting assembly for securing it to a lawn mower whereby the attachment occupies an inoperative position during the normal operation of the lawn mower.

Another object of the invention resides in providing a lawn edge trimming attachment having an improved construction which permits rearrangement of the parts thereof to adapt the attachment to be mounted at either side of the lawn mower.

A further object of the invention lies in the provision of a lawn mower attachment embodying a rotary cutter and adapted to have associated therewith a follower element which moves in the furrow provided by the cutter for increasing the depth of the furrow and for cleaning the cuttings therefrom.

A still further object of the invention is to provide a lawn edge trimming attachment for a lawn mower which is characterized by its simplicity of construction and its effectiveness in operation.

Other objects and features of the present invention will be readily apparent to those skilled in the art from the following specification and appended drawings wherein is illustrated a preferred form of the invention, and in which:

Figure 1 is a perspective view illustrating the lawn edge trimmer of the present invention mounted on a lawn mower.

Figure 2 is a side elevational view showing the lawn mower in normal position and the lawn edge trimmer disposed in inoperative position.

Figure 3 is a side elevational view illustrating the lawn mower in inverted position and the lawn edge trimmer in operating position.

Figure 4 is an enlarged side elevational view looking at the lawn edge trimming attachment from the reverse side of Figures 2 and 3.

Figure 5 is a front elevation of the invention.

Figure 6 is a detail view showing the cutter disk and the member to which it is rotatively mounted.

Having particular reference now to the drawings a lawn edge trimmer attachment, constructed in accordance with the present invention, as indicated generally at 5, and is illustrated in association with a lawn mower 10. Lawn mower 10 is of conventional construction and comprises a handle 11 connected to a carriage 12 which carries a usual rotatable mowing blade assembly 13, is provided with a transverse bracing rod 14, and mounts a pair of revoluble wheels 15 and 16. The wheels 15 and 16 are rotatively supported upon axles 17, which axles 17 are secured at opposite sides of the carriage 12 by nuts 18 threaded upon the ends of the axles 17.

The lawn trimmer attachment 5 comprises a cutting disk 19 having a generally cylindrical bearing lug or member 21 secured thereto, as by welding, at the central portion thereof and extending at a right angle therefrom. A bolt 22 effects an axle for cutting disk 19 and is journaled in bearing lug 21, and extends therethrough and through an opening in the disk 19 to be connected to an elongated, generally rectangular member 23 adjacent its lower end 24. A nut 25 threaded on the end of bolt 22 secures it to rectangular member 23.

A usual washer element 26 is disposed on axle 22 and spaces the cutting disk 19 from the side of rectangular member 23. Cutting disk 19 is adapted to rotate freely upon the support afforded by axle 22.

The rectangular member 23 supports a bolt 27 which projects at right angles thereto and has associated with it a relatively large annular nut means 28. The nut means 28 is made of large size to enable it to be readily manipulated by hand to tightly engage objects disposed upon bolt 27.

To support the cutting disk 19 upon the lawn mower 10 there is afforded a generally U-shaped mounting member 31 having spaced leg portions 32 and 33. Leg 32 of the U-shaped member 31 is connected to the rectangular member 23 by the bolt 27 and the disk or annular nut 28. Nut 28 is adapted to be rotated on bolt 27 to force the leg 32 tightly against the side of rectangular member 23. To insure that the leg 32 of mounting member 31 and the rectangular member 23 do not move relative to one another there is provided upon the rectangular member 23 a projecting portion 34 located adjacent the upper end 35 thereof. A cut is taken, as indicated at 36, in the side 37 of rectangular member 23 adjacent the projection 34 to effect a projecting ledge 38 spaced from the projecting portion 34. The leg portion 32 is adapted to be fitted closely into cut 36 to lie between the projecting portions 34 and 38; this arrangement, it is noted, prevents inadvertent movement of the mounting member 31 relative to the rectangular member 23 when once they have been interconnected by bolt 27 and nut 38.

The connection of the mounting member 31 to the cutting blade 19 and its supporting assembly has been described. To locate the cutting blade 19 upon the lawn mower 10 in operative position the mounting member 31 must next be connected to the lawn mower. To accomplish this the U-shaped mounting member 31 is disposed with its legs 32 and 33 positioned on opposite sides of a wheel of the lawn mower, the particular wheel employed with the mounting member 31 is of no consequence since the mounting member 31 can be positioned relative to either wheel 15 or 16, but for illustrative purposes the mounting member 31 is shown in the drawings as being associated with wheel 15. As is seen from the drawings leg 32 carrying cutting disk 19 is disposed exteriorly of wheel 15 and leg 33 is located on the interior side thereof. Leg 33 is provided with an extended portion 41 having an opening therethrough through which lawn mower axle 17 passes. Nut 18 threaded on axle 17 prevents leg 33 from moving off axle 17.

To prevent rotative movement of leg 33 upon axle 17 a bracing assembly 42 is provided. Bracing assembly 42 includes a rectangular block 43 having a cut 44 therein adapted to fit over the lawn mower brace rod 14. A hook member 45, carried by block 43, at its curved end grasps the leg 33. Nut 46 is threaded upon the opposite end of the hook member 45 and serves to draw the leg 33 tightly against the brace rod 14 and the block 43 to fixedly position the mounting member 31 relative to the lawn mower 5, and thereby properly position the cutting disk 19.

Associated with cutting disk 19 and projecting to the rear thereof is an elongated, curved, finger-like member 47, which is adapted to travel in the furrow effected by the cutting disk 19 to clean it of any cuttings or other debris and to enlarge such furrow. The curved member 47 is carried by the rectangular member 23, with the upper end 48 thereof being fastened to member 23 by a pair of studs 49. A portion of curved member 47 adjacent free end 51 thereof is provided with a sharpened edge to permit ease of movement of this end in the ground.

In the mounted position of the lawn edge trimming assembly 5 it is to be noted that such assembly occupies an inoperative position when the lawn mower 10 is in its normal, or grass-cutting position as shown in Figure 2. Thus the lawn mower 10 is moved to perform its normal function and carries the cutting disk 19 and finger-like member 47 suspended in the air.

When it is desired to trim the edge of the lawn adjacent a walk, flower bed or similar location the lawn mower 10 is inverted and the lawn edge trimming assembly 5 assumes the position of Figure 3. As the lawn mower 5 is moved along in inverted position the cutting disk 19 will rotate to trim the edging of the lawn. The curved finger-like element 47 projecting to the rear of cutting disk 19 will travel in the furrow provided by the cutting disk 19 to enlarge such furrow and to push out any grass cuttings or other debris that may have fallen thereinto, and thereby provide a more finished and neater appearance to the trimming operation.

Although the cutting disk 19 and its mounting assembly have been shown attached to lawn mower 10 adjacent the wheel 15 it is readily apparent that they could be attached to the lawn mower 10 at the opposite side thereof. This would necessitate merely a rearrangement and reversal of the elements comprising the lawn trimming assembly 5 so that cutting disk 19 and curved element 47 would be disposed exteriorly of the wheel 16 and occupying the same position relative to wheel 16 that they occupy relative to wheel 15, as best shown in Figure 1.

In the event that axles 17 which mount the wheels 15 and 16 to the carriage 12 of lawn mower 10 should not be of sufficient length to accomodate the projection 41 of the leg 33 of mounting member 31 it is a simple matter to substitute a bolt therefor having the necessary length and to which the nut 18 can be fitted.

The lawn edge trimming assembly 5 herein described has been provided with a simplicity of construction which adapts it to be readily mounted upon a lawn mower and which is easily moved into and out of operative position merely upon inverting of the lawn mower.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A lawn edge trimmer attachment for a lawn mower, comprising a cutter disk, an axle for rotatably supporting said cutter disk, an elongated member for mounting said axle, a generally U-shaped member, means for connecting one leg of said U-shaped member to said elongated member to position said cutter disc exteriorly of said U-shaped member, means for connecting the other leg of said U-shaped member to the lawn mower, and follower means projecting rearwardly of said cutter disk and adapted to travel in the furrow provided by the cutter disk.

2. A lawn edge trimmer attachment for a lawn mower having revoluble wheels comprising a cutter disk, a bearing lug provided on said cutter disk, an axle journaled in said bearing lug for rotatably carrying said cutter disk, an elongated member for mounting said axle, a generally U-shaped mounting member having one leg thereof disposed on one side of a lawn mower wheel and having its other leg disposed on the opposite side of said lawn mower wheel, means for connecting one of said legs of said U-shaped mounting member whereby said cutter disk is positioned exteriorly of said U-shaped mounting member and is so located that it can occupy an operative position only when the lawn mower is inverted, means for connecting said other leg to the lawn mower and an extended curved member mounted on said elongated member to project rearwardly of said cutter disk and adapted to travel in the furrow cut by the cutter disk.

3. In combination with a lawn mower having a transverse bracing rod, a pair of wheels and axle means for revolubly mounting said pair of wheels, a lawn edge trimmer attachment comprising a generally rectangular member, a cutter disk, axle means carried by and adjacent one end of said rectangular member for rotatably mounting said cutter disk, a generally U-shaped mounting member having one leg disposed exteriorly of a lawn mower wheel and the other leg located at the interior side of said wheel, means for connecting said first mentioned leg of said U-shaped mounting member to said rectangular member whereby said cutter disk is positioned exteriorly of said U-shaped mounting member and is so located that it can occupy an operative position only when the lawn mower is inverted, means to connect said other leg to the axle means for said wheel, and means interconnecting said U-shaped mounting member with said lawn mower bracing rod.

4. In combination with a lawn mower having a transverse bracing rod, a pair of wheels and axle means for revolubly mounting said pair of wheels, a lawn edge trimmer attachment comprising a generally rectangular member, a cutter disk, a bearing lug provided centrally on said cutter disk, an axle supported by said rectangular member adjacent an end thereof and journaled in said bearing lug for rotatably mounting said cutter disk at one side of said rectangular member, a generally U-shaped mounting member having one leg thereof disposed exteriorly of a lawn mower wheel and the other leg located at the interior side of said wheel, means for connecting said first mentioned leg of said U-shaped mounting member to said rectangular member at the side thereof opposite the side to which the cutter disk is mounted whereby said cutting disk is positioned exteriorly of said U-shaped mounting member and is so located that it can occupy an operative position only when the lawn mower is inverted, means to connect said other leg to the axle means for said wheel, and means connecting said U-shaped mounting member with said lawn mower bracing rod.

5. In combination with a lawn mower having a transverse bracing rod, a pair of wheels and axle means for revolubly mounting said pair of wheels, a lawn edge trimmer attachment adapted to be maintained in operative position on inverting of the lawn mower, said lawn edge trimmer attachment comprising a generally rectangular member, a cutter disk, axle means carried by said rectangular member and projecting outwardly therefrom for rotatively supporting said cutter disk, a generally U-shaped mounting member having one leg thereof located exteriorly of a lawn mower wheel and the opposite leg disposed at the interior side of said wheel, nut and bolt means for removably connecting said first mentioned leg of said U-shaped mounting member to said rectangular member at the side thereof opposite the side to which the cutter disk is mounted to position said cutter disc exteriorly of said U-shaped mounting member, means to connect said other leg to the axle means for said wheels, and means connecting said U-shaped mounting member with said lawn mower bracing rod.

6. In combination with a lawn mower having a transverse bracing rod, a pair of wheels and axle means for revolubly mounting said pair of wheels, a lawn edge trimmer attachment adapted to be maintained in operative position on inverting of the lawn mower, said lawn edge trimmer attachment comprising a generally rectangular member, a cutter disk, a bearing lug provided centrally on said cutter disk, axle means carried by said rectangular member and projecting outwardly therefrom to journal in said bearing lug for rotatively supporting said cutter disk, a generally U-shaped mounting member having one leg thereof located exteriorly of a lawn mower wheel and the opposite leg disposed at the interior side of said wheel, nut and bolt means for removably connecting said first mentioned leg of said U-shaped mounting member to said rectangular member at the side thereof opposite the side to which the cutter disk is mounted to position said cutter disc exteriorly of said U-shaped mounting member, spaced projecting portions on said rectangular member between which said first mentioned leg is positioned and adapted to prevent movement of said leg relative to the rectangular member, means to connect said other leg to the axle means for said wheels, and means connecting said U-shaped mounting member with said lawn mower bracing rod.

7. In combination with a lawn mower having a transverse bracing rod, a pair of wheels and axle means for revolubly mounting said pair of wheels, a lawn edge trimmer attachment adapted to be maintained in operative position on inverting of the lawn mower, said lawn edge trimmer attachment comprising a generally rectangular member, a cutter disk, axle means carried by said rectangular member adjacent the lower end thereof and projecting outwardly therefrom for rotatively supporting said cutter disk, a generally U-shaped mounting member having one leg thereof located exteriorly of a lawn mower wheel and the opposite leg disposed at the interior side of said wheel, nut and bolt means for removably connecting said first mentioned leg of said U-shaped mounting member to said rectangular member at the side thereof opposite the side to which the cutter disk is mounted to position said cutter disc exteriorly of said U-shaped mounting member, means to connect said other leg to the axle means for said wheels, means connecting said U-shaped mounting member with said lawn mower bracing rod and an elongated curved member having one end secured to the upper end of said rectangular member and projecting rearwardly of said cutter disk and adapted to travel in the furrow cut by said cutter disk.

8. In combination with a lawn mower having a transverse bracing rod, a pair of wheels and axle means for revolubly mounting said pair of wheels, a lawn edge trimmer attachment adapted to be maintained in operative position on inverting of the lawn mower, said lawn edge trimmer attachment comprising a generally rectangular member, a cutter disk, a bearing lug provided centrally on said cutter disk, axle means carried by said rectangular member adjacent the lower end thereof and projecting outwardly therefrom to journal in said bearing lug for rotatively supporting said cutter disk, a generally U-shaped mounting member having one leg thereof located exteriorly of a lawn mower wheel and the opposite leg disposed at the interior side of said wheel, nut and bolt means for removably connecting said first mentioned leg of said U-shaped mounting member to said rectangular member at the side thereof opposite the side to which the cutter disk is mounted, spaced projecting portions on said rectangular member between which said first mentioned leg is positioned and adapted to prevent movement of said leg relative to the rectangular member, means to connect said other leg to the axle means for said wheels, means connecting said U-shaped mounting member with said lawn mower bracing rod, and an elongated curved member having one end secured to the upper end of said rectangular member and projecting rearwardly of said cutter disk and adapted to travel in the furrow cut by said cutter disk.

HARRY L. SIMMONDS.

REFERENCES CITED

The following references are of record in the file of this patent:

UNITED STATES PATENTS

| Number | Name | Date |
| --- | --- | --- |
| 1,000,028 | Lindsey | Aug. 8, 1911 |